US 8,812,829 B2

(12) United States Patent
Nimura et al.

(10) Patent No.: US 8,812,829 B2
(45) Date of Patent: Aug. 19, 2014

(54) INFORMATION PROCESSING APPARATUS AND START-UP METHOD

(75) Inventors: Kazuaki Nimura, Kawasaki (JP); Zhaogong Guo, Kawasaki (JP); Kouichi Yasaki, Kawasaki (JP); Yousuke Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 13/166,328

(22) Filed: Jun. 22, 2011

(65) Prior Publication Data

US 2011/0320801 A1  Dec. 29, 2011

(30) Foreign Application Priority Data

Jun. 24, 2010 (JP) ................................. 2010-144123

(51) Int. Cl.
*G06F 9/445* (2006.01)
*H04L 9/32* (2006.01)
*G06F 21/80* (2013.01)
*G06F 9/44* (2006.01)

(52) U.S. Cl.
CPC ............ *H04L 9/3226* (2013.01); *G06F 21/805* (2013.01); *H04L 2209/80* (2013.01); *G06F 9/4418* (2013.01)
USPC .................................................. 713/2; 713/1

(58) Field of Classification Search
USPC ........................................................ 713/1, 2
See application file for complete search history.

(56) References Cited

U.S. PATENT DOCUMENTS

| 6,615,303 | B1 | 9/2003 | Endo et al. |
| 6,928,541 | B2 * | 8/2005 | Sekiguchi ......................... 713/2 |
| 7,154,692 | B2 * | 12/2006 | Ogawa et al. ................... 360/61 |
| 7,328,333 | B2 | 2/2008 | Kawano et al. |
| 7,529,923 | B2 * | 5/2009 | Chartrand et al. ................ 713/2 |
| 8,171,280 | B2 * | 5/2012 | Laue ................................. 713/2 |
| 2001/0018717 | A1 | 8/2001 | Shimotono |
| 2002/0167307 | A1 * | 11/2002 | Chaparala ................ 324/207.13 |
| 2008/0167002 | A1 * | 7/2008 | Kim et al. ..................... 455/411 |
| 2009/0144833 | A1 | 6/2009 | Gushiken |

FOREIGN PATENT DOCUMENTS

| JP | 11-288366 | 10/1999 |
| JP | 2000-330806 | 11/2000 |
| JP | 2001-256066 | 9/2001 |
| JP | 2003-196096 | 7/2003 |
| JP | 2009-134595 | 6/2009 |

* cited by examiner

*Primary Examiner* — Thuan Du
(74) *Attorney, Agent, or Firm* — Fujitsu Patent Center

(57) ABSTRACT

An information processing apparatus includes, a processer, a non-volatile memory to store a plurality of programs, a volatile memory to store at least one program executed by the processor and data accessed by the program, an acceptance unit to accept context information when power supplied to the processor is resumed from a state in which power supplied to the processor is interrupted while a power supplied to the volatile memory is maintained, a selection unit to select one program from the plurality of programs stored in the non-volatile memory based on context information accepted by the acceptance unit, and a program determination unit to determine whether the one program selected by the selection unit is stored in the volatile memory. When the processor determines the one program selected by the program determination unit is stored in the volatile memory, the processor starts the one program stored in the volatile memory.

15 Claims, 17 Drawing Sheets

FIG. 2

| REGISTERED CONTEXT | START-UP OS |
|---|---|
| USE AT COMPANY | FIRST OS |
| USE AT HOME | SECOND OS |
| USE AT UNREGISTEED PLACE | NONE |

| REGISTERED POSITION | CSID | RSSI |
|---|---|---|
| COMPANY | 8185A506D902 | 64 |
|  | 8185A40Ab300 | 51 |
|  | 8185A50A6C02 | 49 |
| HOME | 8003A406D002 | 44 |
|  | 8003A40Ab300 | 52 |
|  | 8003A50A6C02 | 67 |

FIG. 6

| REGISTERED CONTEXT | START-UP OS |
|---|---|
| NOT MOVED AND USED AT FIFTH FLOOR OF COMPANY | FIRST OS |
| MOVED AND USED AT FIFTH FLOOR OF COMPANY | NONE |
| USED AT FLOORS OTHER THAN FIFTH FLOOR OF COMPANY | SECOND OS |
| USED OUTSIDE OF COMPANY | NONE |

| REGISTERED CONTEXT | START-UP OS |
|---|---|
| USE AT COMPANY 9:00 TO 18:00 | FIRST OS |
| USE AT COMPANY OTHER THAN 9:00 TO 18:00 | SECOND OS |
| USE AT HOME | SECOND OS |
| USE AT UNREGISTERED PLACE | NONE |

| REGISTERED CONTEXT | AUTHENTICATION SETTINGS | START-UP OS |
|---|---|---|
| USE AT COMPANY | NO | FIRST OS |
| USE AT HOME | AUTHENTICATE | SECOND OS |
| USE AT UNREGISTEED PLACE | AUTHENTICATE | NONE |

| REGISTERED CONTEXT | START-UP OS |
|---|---|
| USE COMPANY'S PC ENVIRONMENT AT COMPANY | FIRST OS |
| USE HOME'S PC ENVIRONMENT AT HOME | SECOND OS |
| USE COMPANY'S PC ENVIRONMENT AT HOME | FIRST OS |
| USE AT UNREGISTERED PLACE | NONE |

432

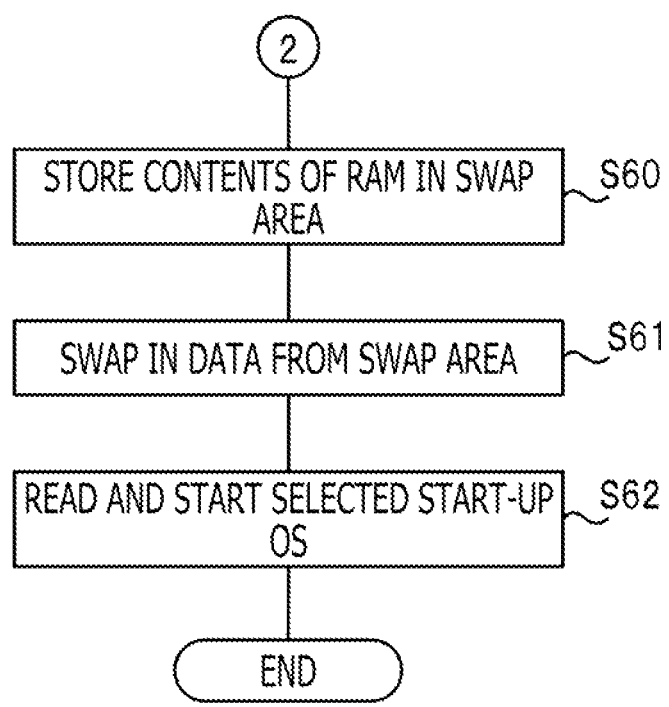

INFORMATION PROCESSING APPARATUS AND START-UP METHOD

CROSS-REFERENCE TO RELATED APPLICATIONS

This application is based upon and claims the benefit of priority of the prior Japanese Patent Application No. 2010-144123, filed on Jun. 24, 2010, the entire contents of which are incorporated herein by reference.

FIELD

The embodiments discussed herein are related to an information processing apparatus that may select programs to be started according to a use state when the information processing apparatus is resumed from a suspend state.

BACKGROUND

Computers with suspend functions have been used that halt the supply of power to some components of internal hardware, and thereby saving power consumption. Under a suspend state, power supplied to a non-volatile memory such as a Hard Disk Drive (HDD) and a Central Processing Unit (CPU) are halted while maintaining a power supplied to a volatile memory such as a Random Access Memory (RAM) to retain stored contents. As described above, the stored contents are retained in the volatile memory. Therefore, swapping in basic programs such as an Operating System (OS), application programs and various data from the non-volatile memory to the volatile memory is not needed when a computer is resumed from the suspend state. Accordingly, the computer reproduces a state immediately before transitioning to the suspend state at a high speed.

The CPU in the above-described computer reads and executes a Basic Input/Output System (BIOS) stored, for example, in a Read-Only Memory (ROM) of a non-volatile memory. The CPU recovers states of respective internal hardware components other than the RAM to the states before transitioning to the suspend state according to the BIOS and starts the OS stored in the RAM. The CPU resumes execution of application programs, for example, that are stored in the RAM after starting the OS and reproduces the state of the CPU before transitioning to the suspend state.

There is a case in which a plurality of operating systems are stored in a HDD, etc. that is included in a computer and an OS to be started up by the CPU that may be manually selected from the plurality of operating systems. When a suspend function is provided to the above-described computer that stores a plurality of operating systems, there is a case in which an OS to be started up is selected when resuming from the suspend state (for example, Japanese Laid-open Patent Publication Nos. 11-288366, 2003-196096, 2000-330806, 2001-256066, and 2009-134595).

SUMMARY

According to an aspect of the embodiments, an information processing apparatus includes, a processor, a non-volatile memory configured to store a plurality of programs, a volatile memory configured to store at least one program executed by the processor and data accessed by the program, an acceptance unit configured to accept context information when power supplied to the processor is resumed from a state in which power supplied to the processor is interrupted while a power supplied to the volatile memory is maintained, a selection unit configured to select one program from the plurality of programs stored in the non-volatile memory based on context information accepted by the acceptance unit, and a program determination unit configured to determine whether the one program selected by the selection unit is stored in the volatile memory.

The processor swaps out data stored in the volatile memory to the non-volatile memory in association with a program stored in the non-volatile memory, and swaps in the one program selected by the selection unit from the non-volatile memory to the volatile memory and starts up the program when the program determination unit determines the selected one program is not stored in the volatile memory, and when the processor determines the one program selected by the program determination unit is stored in the volatile memory, the processor starts the one program stored in the volatile memory.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an example of a record layout of a registered context table;

FIG. 3 illustrates an example of a record layout of a registered position table;

FIG. 6 is an example of a record layout of a registered context table according to the second embodiment;

FIG. 9 is an example of a record layout of a registered context table according to the fourth embodiment;

FIG. 12 is an example of a record layout of a registered context table according to the fifth embodiment;

FIG. 14 is an example of a record layout of a registered context table according to a sixth embodiment; and FIGS. 15A and 15B are flow charts illustrating procedures of Operating system (OS) start-up processing according to the sixth embodiment.

DESCRIPTION OF EMBODIMENTS

First Embodiment

Figure 1:
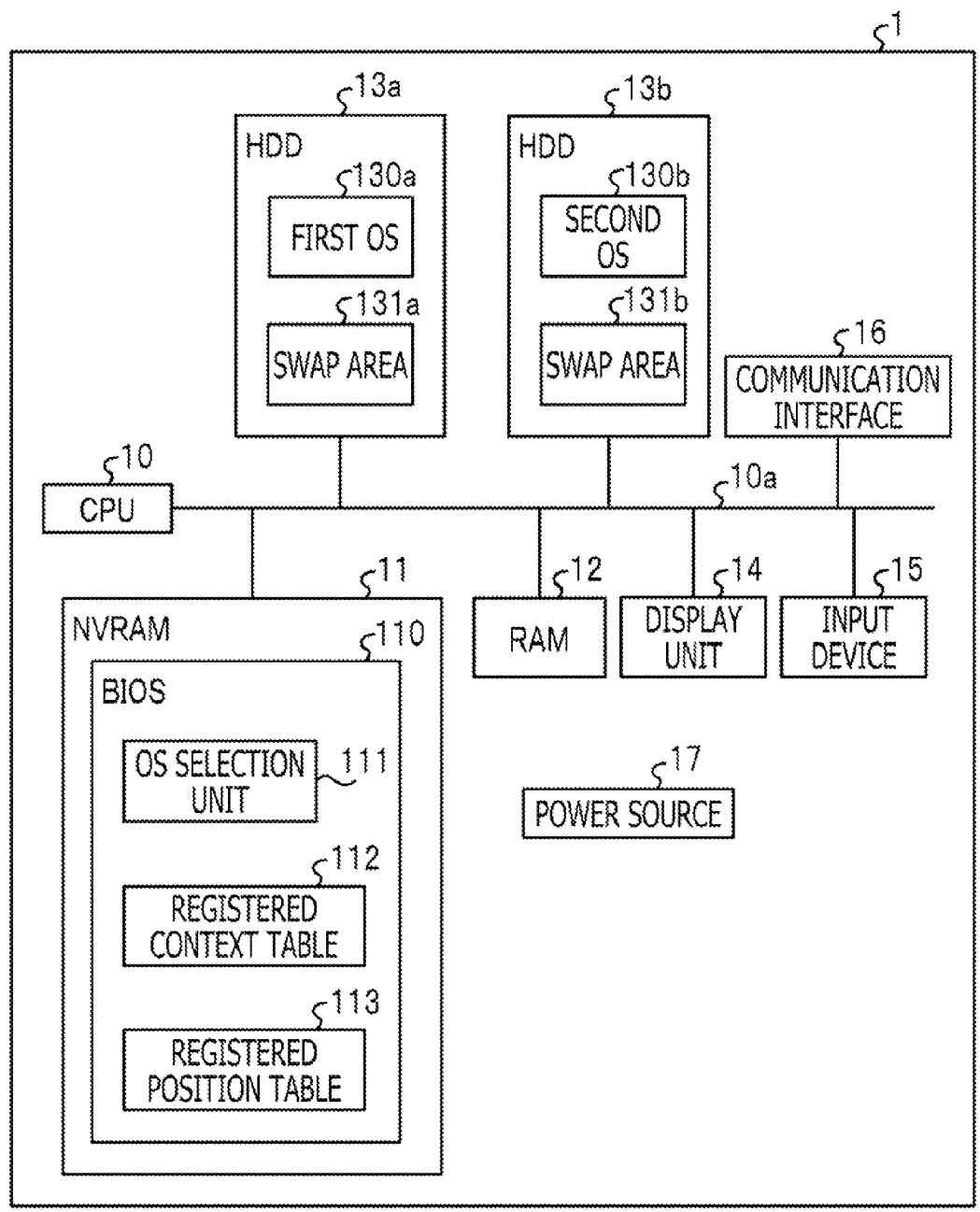
FIG. 1 is a block diagram illustrating an example of internal hardware of a personal computer.

Hereinafter, an embodiment will be described by referring to accompanying drawings. An information processing apparatus according to the first embodiment includes a processor, a volatile memory, and a non-volatile memory, and swaps in a part of an Operating System (OS) stored in the non-volatile memory to the volatile memory when the power is turned on. The OS is a basic program to provide, for example, interfaces to application programs to access respective internal hardware components of the information processing apparatus. The information processing apparatus accepts instructions through a user operation or another computer after starting up the OS, swaps in various application programs from the non-volatile memory to the volatile memory and executes the programs. The volatile memory stores data, for example, accessed by application programs being executed. Moreover, the information processing apparatus includes a suspend function to transition to a suspend state.

When the information processing apparatus accepts an instruction to transition to a suspend state, for example, through a user operation, power supplied to the processor and the non-volatile memory and so on is interrupted while a power supplied to the volatile memory is maintained, and ends the OS and application programs being executed. As a result, power supplied to other hardware components are stopped while contents stored in the volatile memory are retained. Accordingly, the information processing apparatus transitions to a suspend state, which is a power saving state. The information processing apparatus resumes power supply when the information processing apparatus accepts an instruction to resume from the suspend state, for example, through a user operation. The information processing apparatus obtains context information that indicates a context.

The context here indicates a condition in which the information processing apparatus is used. For example, the context may be a position where the information processing apparatus is placed. According to the embodiment, a position of the information processing apparatus may be obtained as context information based on position information received externally. The position information may include e.g., Global Positioning System (GPS) information transmitted by GPS satellite, information transmitted by each access point of a Wireless Local Area Network (Wireless LAN), and base station information transmitted by each base station of mobile phones. The information processing apparatus selects a start-up OS based on the obtained context information and resumes from the suspend state.

The information processing apparatus may be a personal computer (PC) or a mobile information terminal such as a smart phone that includes a CPU as a processor, a Random Access Memory (RAM) as a volatile storage unit, and a HDD or a flash memory as a non-volatile memory, for example. According to the embodiment, a PC will be described as an example of an information processing apparatus. According to the embodiment, Cell Station Identification (CSID) information transmitted by each base station of mobile phones will be described as an example of position information.

FIG. 1 is a block diagram illustrating an example of internal hardware of a PC. A PC 1 includes a CPU 10 as a processor that performs key functions, and a HDD 13*a* and a HDD 13*b* that are nonvolatile memories to store various data and programs. The PC 1 includes a RAM 12 that is a volatile memory to store data and programs that are swapped in from the HDD 13*a* and the HDD 13*b*, and a Nonvolatile Random Access Memory (NVRAM) 11. The CPU 10 controls each internal hardware component connected through a bus 10*a*. The HDD 13*a* stores a first OS 130*a* that is started by the CPU 10 and includes a swap area 131*a* that provides an area to swap out contents stored in the RAM 12.

The HDD 13*b* stores a second OS 130*b* that is started up by the CPU 10 and includes a swap area 131*b* that functions as a swap area to swap out contents stored in the RAM 12. Swapping out contents to the swap area 131*a* is executed when the first OS 130*a* is running before transitioning to a suspend state and the second OS 130*b* is selected as a start-up OS when resuming from the suspend state. Accordingly, the swap area 131*a* stores contents stored in the RAM 12 in association with the first OS 130*a*. Swapping out contents to the swap area 131*b* is executed when the second OS 130*b* is running before transitioning to a suspend state and the first OS 130*a* is selected as a start-up OS when resuming from the suspend state.

As a result, the swap area 131*b* stores contents stored in the RAM 12 in association with the second OS 130*b*. The HDD 13*a* and the HDD 13*b* store application programs to be executed on the started OS. The HDD 13*a* and the HDD 13*b* store data transmitted from the CPU 10 and swaps in data and programs requested by the CPU 10 to RAM 12.

The PC 1 includes a display device 14 such as a liquid crystal display, an input device 15 for a user input operation such as a keyboard and a mouse, a communication interface 16 to communicate with base stations of mobile phones through radio waves, and a power source 17 to supply power to each internal hardware component. For example, a base station of a Personal Handy-phone System (PHS®) may be used as a base station of a mobile phone with which the communication interface 16 communicates. The communication interface 16 receives CSID information transmitted from a base station that is a transmission source of radio waves in order to identify the base station and obtains a Received Signal Strength Indicator (RSSI) that indicates intensity of the received signal as position information. Accordingly, the communication interface 16 functions as a position detector.

The power source 17 starts to supply power to each internal hardware component when an operation to turn on the power supply is received through a power switch, which is not illustrated. The power source 17 stops supplying power to each internal hardware component when an operation to turn off the power supply is received. Moreover, when the PC 1 transitions to a suspend state, the power source 17 transitions to a power saving state by maintaining power supply to the RAM 12 while interrupting the power supply to the CPU 10, the NVRAM 11, the HDD 13*a*, the HDD 13*b*, the display device 14, the input device 15 and the communication interface 16. When the PC 1 resumes operations from the suspend state, the power source 17 resumes supplying power to each internal hardware component and transitions from the power saving state.

The NVRAM 11 is a Static Random Access Memory (SRAM) to which power is supplied by a small battery, and retains stored information even while power is not supplied. The NVRAM 11 stores a BIOS 110 that is a program to initialize each internal hardware component in order to start up an OS. The BIOS 110 includes an OS selection unit 111 that is a program module to select a start-up OS when the PC 1 resumes from a suspend state. The OS selection unit 111 also functions as a program determination unit to determine whether the selected OS matches an OS that is running before transitioning to the suspend state.

Moreover, the OS selection unit 111 also functions as an acceptance unit to accept context information and a prohibition determination unit to determine whether starting an OS is prohibited according to the accepted context information when the PC 1 resumes from a suspend state. The BIOS 110 includes a registered context table 112 in which an OS to be started according to context information is registered and a registered position table 113 in which a specific position is registered using position information. The registered context table 112 and the registered position table 113 are not limited to be included in the BIOS 110 but also may be stored in the NVRAM 11 and may be read from the BIOS 110.

When the PC 1 resumes from a suspend state, the CPU 10 reads the BIOS 110 from the NVRAM 11, executes the BIOS, and initializes respective internal hardware components other than the RAM 12. The CPU 10 executes OS start-up processing, which will be described later, that starts up the selected OS. In the OS start-up processing, context information is obtained based on the CSID information, the RSSI information, and the registered position table 113. The first OS 130*a* or the second OS 130*b* is selected and started based on the obtained context information and the registered context table 112.

FIG. 2 is an example of a record layout of the registered context table 112. The registered context table 112 of the PC 1 stores and registers a plurality of pieces of context information and a start-up OS in association with each piece of context information. In the example of FIG. 2, three types of context information, "use at company," "use at home," and "use at unregistered place" are stored as registered context information. The "first OS" that indicates that the first OS 130*a* is registered in the registered context "use at company" as a start-up OS.

The "second OS" that indicates that the second OS 130*b* is registered in the registered context, "use at home" as a start-up OS. The "None" that indicates starting up of the OS is prohibited is registered in the registered context, "use at unregistered place" as a start-up OS. The registered context "use at company" and "use at home" indicate that the PC 1 is located at the company and home registered in the registered position table 113, respectively. The registered context "use at unregistered place" indicates the PC 1 is located at a position that is not registered in the registered position table 113.

FIG. 3 illustrates an example of a record layout of the registered position table 113. The PC 1 registers a specific position by registering the specific position in the registered position table 113 as a registered position using CSID information and RSSI information. In the example of FIG. 3, registered positions that indicate the company and the home, respectively are stored and each registered position stores three pieces of CSID information and RSSI information that is associated with each piece of CSID information. In order to register a specific position in the PC 1, the PC 1 may experimentally receive radio waves transmitted from a plurality of base stations at the specific position and register the received CSID information and RSSI information that is obtained together with each piece of the CSID information in the registered position table 113.

Mobile phone companies may provide a service to inquire CSID information and RSSI information at each position, for example, through the Internet. CSID information and RSSI information at a specific position to be registered may be obtained using the above-described service. When a combination of CSID information received from three base stations and the RSSI information obtained together with each piece of CSID information are stored in the registered position table 113, the PC 1 obtains a registered position that corresponds to the combination as context information where the PC 1 is placed.

For example, three pieces of CSID information, "8185A506D902," "8185A40Ab300," and "8185A50A6C02" are stored in the registered place, "company." Moreover, RSSI information "64," "51," and "49" are stored in association with each piece of CSID information. When the PC 1 obtains the combination of the CSID information and the RSSI information, the registered position, "company" is obtained as the context information.

Figure 4:
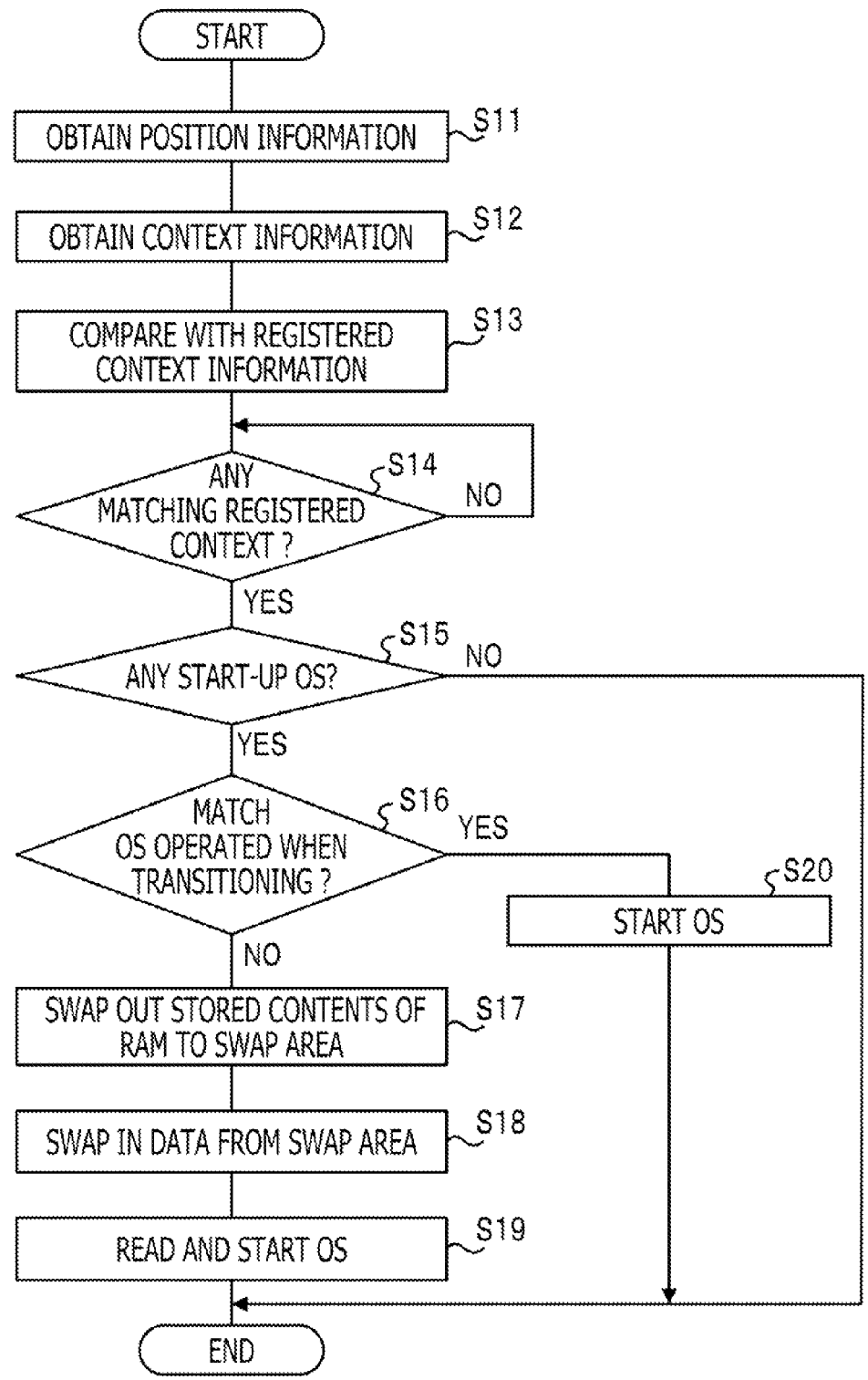
FIG. 4 is a flow chart illustrating procedures of Operating System start-up processing.

FIG. 4 is a flow chart illustrating procedures of the OS start-up processing. The CPU 10 executes the Operating system start-up processing according to the OS selection unit 111 included in the BIOS 110 that is read from the NVRAM when the PC 1 resumes operations from a suspend state. The CPU 10 obtains position information including CSID information and RSSI information received through the communication interface 16 (S11). The CPU 10 obtains context information based on the obtained position information and the registered position table 113 (S12). The CPU 10 compares the obtained context information with the registered contexts stored in the registered context table 112 (S13).

The CPU 10 determines whether there is any registered context that matches the obtained context information as a result of the comparison (S14). When the CPU 10 determines that there is a registered context that matches the obtained context information (Yes at S14), the CPU 10 determines whether there is any start-up OS stored in the registered context table 112 in association with the matched registered context (S15). When the CPU 10 determines that there is a start-up OS that is stored in the registered context table 112 (Yes at S15), the CPU 10 selects the start-up OS and determines whether the start-up OS matches the OS that is running when the PC 1 transitions to a suspend state (S16).

The OS that is running when the PC 1 transitions to the suspend state may be obtained by referring to the OS retained in the RAM 12. When the CPU 10 determines the start-up OS matches the OS that is running when the PC 1 transitions to a suspend state (Yes at S16), the CPU starts up the OS retained in the RAM 12 (S20) and ends the OS start-up processing. When the CPU 10 determines the start-up OS does not match the OS that is running when the PC 1 transitions to the suspend state (No at S16), the CPU 10 swaps out data stored in the RAM 12 to the swap area 131*a* or the swap area 131*b* (S17). When the first OS 130*a* is stored in the RAM 12, data stored in the RAM 12 is swapped out to the swap area 131*a*.

When the second OS 130*b* is stored in the RAM 12, data stored in the RAM 12 is swapped out to the swap area 131*b*. The CPU 10 swaps in the data that is swapped out to the swap area 131*b* to the RAM 12 (S18). The CPU 10 swaps in data from the swap area 131*a* when the start-up OS is the first OS 130*a*. The CPU 10 swaps in data from the swap area 131*b* when the start-up OS is the second OS 130*b*. The CPU 10 swaps in and starts up the first OS 130*a* or the second OS 130*b* that are selected as the start-up OS from the HDD 13*a* or the HDD 13*b* (S19) and ends the OS start-up processing.

When the CPU 10 determines that there is no matching registered context at S14 (No at S14), the CPU 10 resumes to S14 and executes an infinite loop. Accordingly, when there is no registered context that matches context information obtained when the PC 1 is resumed from a suspend state; the start up of an OS is prohibited. When the CPU 10 determines there is no matching context at S14 (No at S14), the CPU 10 may make the power source 17 stop supplying power to the respective internal hardware components and prohibit starting up of an OS. When the CPU 10 determines there is no start-up OS stored in the registered context table 112 (No at S15), prohibits starting up of an OS and ends the OS start-up processing without starting any OS.

According to the first embodiment, a case is described in which a position where the PC 1 is located is obtained as context information based on the CSID information and the RSSI information. However, the embodiment is not limited to this case. For example, context information may be obtained based on the CSID information without obtaining the RSSI information. Furthermore, a case is described in which a combination of three pieces of the CSID information are registered for each registered position, however the embodiment is not limited to the combination but one piece, two pieces of, or four or more pieces of the CSID information may be stored.

Moreover, the case in which the PC 1 stores the first OS 130a and the second OS 130b is described; however the embodiment is not limited thereto. For example, three or more OSs may be stored. In this case, a plurality of HDDs that stores each OS, and that includes a swap area is provided in the PC 1. The OS to be started up in association with each piece of context information is selected from three or more OSs and may be stored in the registered context table 112. The plurality of OSs stored in the PC 1 is not limited to different types of OSs but may be the same kind of OS. The example in which an OS to be started up is selected when resuming operations from a suspend state is described. However, the embodiment is not limited thereto. For example, application programs to be executed over the started up OS may be selected and executed based on the context information.

A case is described in which the PC 1 includes two HDDs, the HDD 13a and the HDD 13b. However the embodiment is not limited thereto. For instance, one of the HDDs may be a HDD and the other may be a flash memory. A case is described in which the swap area 131a and the swap area 131b are included in the HDD 13a and the HDD 13b respectively, however the embodiment is not limited to this. For example, the swap area 131a and the swap area 131b may be included in one of the HDD 13a or the HDD 13b. In this case, the contents stored in the RAM 12 may be swapped out to the swap area 131a and the swap area 131b that are included in one of the HDD 13a or the HDD 13b in association with the first OS 130a and the second OS 130b, respectively. Moreover, a case is described in which the swap area 131a and the swap area 131b are included in the HDD 13a or the HDD 13b. However the embodiment is not limited to this. For example, the swap area 131a and the swap area 131b may be included in the NVRAM 11.

According to the first embodiment, a start-up OS is selected based on context information. Therefore, an OS to be started up when the PC 1 resumes operations from the suspend state may be automatically selected. Furthermore, unauthorized loss of data stored in the PC 1 moved to an unregistered location may be reduced, if not substantially prevented by selecting an OS to be started up or prohibiting starting an OS according to a location where the PC 1 is located when resuming operations from the suspend state. When an OS is started up that is different from an OS that is running before the PC 1 transitions to the suspend state, data etc. stored in the RAM is swapped out to the swap area 131a or 131b.

Accordingly, when an OS associated with the swapped out data is selected when resuming from the suspend state, the data is swapped in the RAM 12, and the state that the OS is running before transitioning to the suspend state may be reproduced. Moreover, each of the plurality of HDDs stores each OS and includes a swap area associated with each OS. Thus, the stored contents that are swapped out in association with each OS are isolated in each HDD. As a result, reading the stored contents that are swapped out in association with other OS by an OS that is started up when resuming from a suspend state may be substantially prohibited and the loss of data may be reduced, if not substantially prevented.

Second Embodiment

Figure 5:
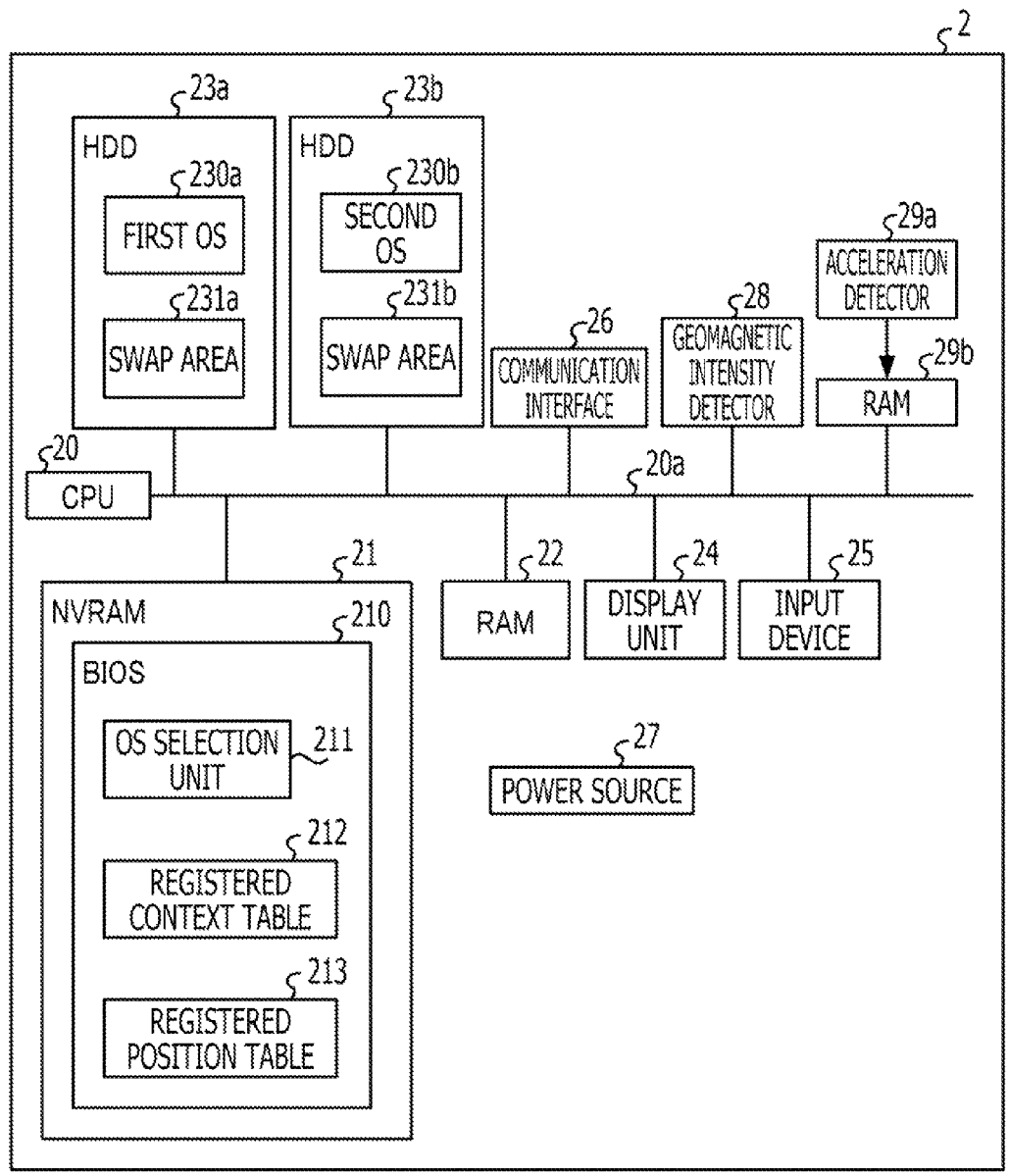
FIG. 5 is a block diagram illustrating an example of internal hardware of a personal computer according to a second embodiment.

According to the second embodiment, a detected geomagnetic intensity and a history of acceleration are further obtained while CSID information and RSSI information are obtained according to the first embodiment. FIG. 5 is a block diagram illustrating an example of internal hardware of a PC according to the second embodiment. A PC 2 includes a geomagnetic intensity detector 28, an acceleration detector 29a, a RAM 29b, and a power source 27. The geomagnetic intensity detector 28 detects geomagnetic intensity. The acceleration detector 29a detects acceleration. The RAM 29b stores the history that the acceleration detector 29a detects acceleration. The power source 27 supplies power to each internal hardware component. Other internal hardware components of the PC 2 are substantially the same as those of the first embodiment, a difference being the reference numerals that are used to describe the hardware components and thereby will not be described in further detail.

The PC 2 includes a CPU 20, an NVRAM 21, a RAM 22, a HDD 23a, a HDD 23b, a display device 24, an input device 25, and a communication interface 26. The CPU 20 controls internal hardware components through a bus 20a. The HDD 23a stores a first OS 230a and includes a swap area 231a. The HDD 23b stores a second OS 230b and includes a swap area 231b. The power source 27 starts to supply power to each internal hardware component when an operation to turn on power supply is received through a power switch, which is not illustrated. The power source 27 halts the supply of power to each internal hardware component when an operation to turn off the power supplied is received.

Moreover, when the PC 2 transitions to a suspend state, the power source 27 transitions to a power saving state by maintaining power supplied to the RAM 22, the acceleration detector 29a, and the RAM 29b, while interrupting the power supplied to the remaining internal hardware component. The power source 27 resumes the power supplied to each internal hardware component and resumes from the power saving state when the PC 2 resumes operations from the suspend state. The geomagnetic intensity detector 28 detects a geomagnetic intensity. The acceleration detector 29a stores a detection of the acceleration in the RAM 29b if the acceleration exceeds a threshold due to the PC 2 being moved to another location after transitioning to a suspend state. Contents stored in the RAM 29b are erased before the PC 2 transitions to a suspend state.

The NVRAM 21 stores a BIOS 210. The BIOS 210 includes an OS selection unit 211, a registered context table 212, and a registered position table 213. The PC 2 stores a specific position by registering the specific position in the registered position table 213 using CSID information and RSSI information. Moreover, the PC 2 stores a specific floor number in association with a geomagnetic intensity in the registered position table 213, and thereby the specific floor number is registered. When CSID information received and obtained by the communication interface 26 and position information received from a base station when resuming from the suspend state are stored in the registered position table 213, the PC 2 obtains the corresponding registered position.

When the geomagnetic intensity detected by the geomagnetic intensity detector 28 is stored in the registered position table 213, the PC 2 obtains the corresponding floor number. Moreover, the PC 2 determines whether the PC 2 is moved to another location after transitioning to a suspend state. When the detection of acceleration is stored in the RAM 29b, the PC 2 may determine that the PC 2 is moved after transitioning to the suspend state. Furthermore, when the detection of acceleration is not stored in the RAM 29b, the PC 2 may determine the PC 2 is not moved to another location after transitioning to the suspend state. The PC 2 obtains the obtained position and the floor number, and the determination result whether the PC 2 is moved to another location as context information.

FIG. 6 is an example of a record layout of the registered context table 212 according to the second embodiment. In the example of FIG. 6, the following four types of pieces of context information are stored as the registered context. The four types of context information are: "not moved and used at fifth floor of company," "moved and used at fifth floor of company," "used at floors other than fifth floor of company," and "used outside of company." A start-up OS or prohibition of starting OS is registered in each registered context as a start-up OS. The "first OS" is registered in the registered context, "not moved and used at fifth floor of company" as the start-up OS. This indicates that the first OS 230a is started up when context information that includes the company of the registered position, the fifth floor, and the determination result that PC 2 is not moved to a new location are obtained when resuming from the suspend state.

The "None" is registered in the registered context, "moved and used at fifth floor of company" as a start-up OS. This indicates starting up the OS is prohibited when context information that includes the company of the registered position, the fifth floor, and the determination result that PC 2 is moved to a new location are obtained when resuming operations from the suspend state. The "second OS" is registered in "used at floors other than fifth floor of company" as a start-up OS. This indicates that the second OS 230b is started up when context information that includes the company of registered position, and floor number other than the fifth floor are obtained when resuming operations from the suspend state. The "None" is registered in the registered context, "use other than company" as a start-up OS.

This indicates starting up an OS is prohibited when context information that does not include the company of the registered position is obtained when resuming operations from the suspend state. Accordingly, an OS to be started up is selected or starting up the OS is prohibited according to a registered position and a floor number in the building where the PC 2 is located. In the OS start-up processing executed by the CPU 20 through the OS selection unit 211, geomagnetic intensity detected by the geomagnetic intensity detector 28 and history of acceleration stored in the RAM 29b may be obtained in addition to the position information at S11 of the flow chart in FIG. 4. Other procedures of the OS start-up processing are substantially the same as those illustrated in the flow chart in FIG. 4, and thereby will not be described in detail.

According to the second embodiment, a case is described in which the obtained registered position and the floor number, and determination result indicating whether the PC 2 is moved to another location after transitioning to the suspend state are obtained as the context information. However, the embodiment is not limited thereto. For example, the obtained registered position and the determination result may be obtained as context information without providing the geomagnetic intensity information detected by geomagnetic intensity detector 28. In this case, the PC 2 may register a start-up OS or prohibition of starting OS according to the registered position and the determination result. Moreover, for example, a registered position and floor number may be obtained as context information without providing information from the acceleration detector 29a and a RAM 29b. In this case, the PC 2 may register a start-up OS or prohibition of starting an OS according to the registered position and the floor number.

A case is described that when the acceleration detector 29a detects an acceleration exceeding a threshold, a history of the detected acceleration is stored in the RAM 29b. However, the embodiment is not limited to this; the history may be stored, for example, in the HDD 23a, the HDD 23b, or the NVRAM 21. A case is described that the history of the acceleration detector 29a detects acceleration exceeding a threshold is indicated and stored in the RAM 29b. However, the embodiment is not limited to this. For example, a timer is provided in the PC 2 and the time that is output by the timer may be stored in the RAM 29b when the acceleration detector 29a detects an acceleration exceeding the threshold regardless of occurring before or after transitioning to a suspend state. Furthermore, the time that is output by the timer when transitioning to the suspend state is stored in the RAM 29b as a suspend transition time. Whether a time at or time later than transitioning to the suspend state is stored in the RAM 29b is determined when resuming operations from the suspend state. Whether the PC 2 is moved to another location may be determined by determining whether the time at or time later than the suspend transition time is stored in the RAM 29b when resuming operations from the suspend state.

According to the second embodiment, a selection of a start-up OS or prohibition of starting OS is conducted according not only to the position where the PC 2 is located but also according to a floor number in a building. Therefore, unauthorized loss of data stored in the PC 2 because the PC 2 is moved to an unregistered floor may be reduced, if not substantially prevented. Furthermore, loss of data stored in the PC 2 that is moved to another location due to, for example, a theft may be reduced, if not substantially prevented because selection of the start-up OS or prohibition of starting OS is conducted according to whether the PC 2 is moved to another location after transitioning to the suspend state.

The second embodiment is as described above. Elements in the second embodiment corresponding to those in the first embodiment are assigned with substantially the same reference numerals and processing names, and will not be described in detail about a similar part to the first embodiment.

Third Embodiment

Figure 7:
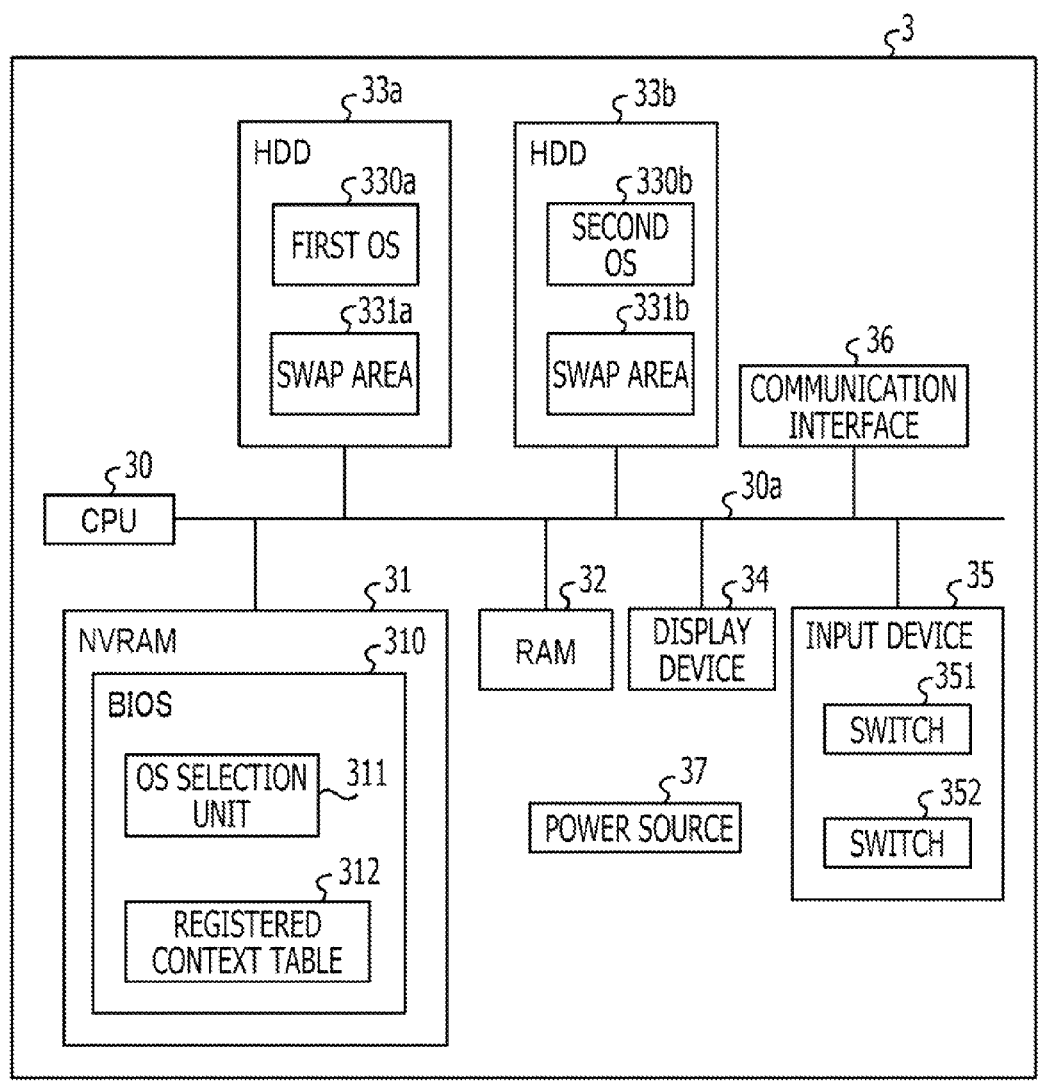
FIG. 7 is a block diagram illustrating an example of internal hardware of a personal computer according to a third embodiment.

According to the third embodiment, a switch that is operated is obtained as context information whereas according to the first embodiment, position information is obtained as context information. FIG. 7 is a block diagram illustrating an example of internal hardware components of a personal computer according to the third embodiment. A PC 3 includes an input device 35 that includes a switch 351 and a switch 352. Other internal hardware components in the PC 3 are substantially the same as those of the first embodiment. Hence, the different reference numerals that are used to describe the hardware components and will not be described in detail. The PC 3 includes a CPU 30, an NVRAM 31, a RAM 32, a HDD 33a, a HDD 33b, a display device 34, a communication interface 36, and a power source 37.

The CPU 30 controls each internal hardware component through a bus 30a. The NVRAM 31 stores a BIOS 310. The BIOS 310 includes an OS selection unit 311 and a registered context table 312. The HDD 33a stores a first OS 330a and includes a swap area 331a. The HDD 33b stores a second OS 330b and includes a swap area 331b. The registered context table 312 stores information indicating that the first OS 330a and the second OS 330b are associated with the switch 351 and the switch 352, respectively. Accordingly, the PC 3 registers a start-up OS in association with an operation of the switch 351 and an operation of the switch 352, respectively.

The PC 3 accepts a turn-on operation of the switch 351 or the switch 352 from a user when resuming operations from a suspend state.

The PC 3 obtains the accepted turn on operation of the switch 351 or the switch 352 as context information. The PC 3 reads and selects a start-up OS corresponding to the obtained context information from the registered context table 312, and executes the selected OS. For example, if the switch 351 is operated when resuming operations from a suspend state, the first OS 330a is selected. If the switch 352 is operated when resuming operations from a suspend state, the second OS 330b is selected. The OS start-up processing executed by the CPU 30 through the OS selection unit 311 may obtain the switch 351 or the switch 352 that accepts a turn on operation instead of the position information at S11 in the flow chart illustrated in FIG. 4. Other procedures of the OS start-up processing are substantially the same as the flow chart illustrated in FIG. 4, and thereby will not be described in detail.

According to the third embodiment, a case is described in which an OS to be started up is selected by selecting the switch 351 or the switch 352 by a user operation when resuming operations from a suspend state. However, the embodiment is not limited to this case. For example, an operation to resume operations from a suspend state may be accepted through a user operation of the switch 351 or the switch 352, respectively. In this case, an instruction to resume operations from the suspend state is accepted through a user operation of the switch 351 or the switch 352, and a start-up OS is selected by a user. According to the third embodiment, a user operates a switch that corresponds to each OS. Thus, an OS to be started up when resuming operations from a suspend state may be selected.

The third embodiment is as described above. Elements in the third embodiment corresponding to those in the first and the second embodiments are assigned with substantially the same reference numerals and processing names, and will not be described in detail about a similar part to the first and the second embodiments.

Fourth Embodiment

Figure 8:
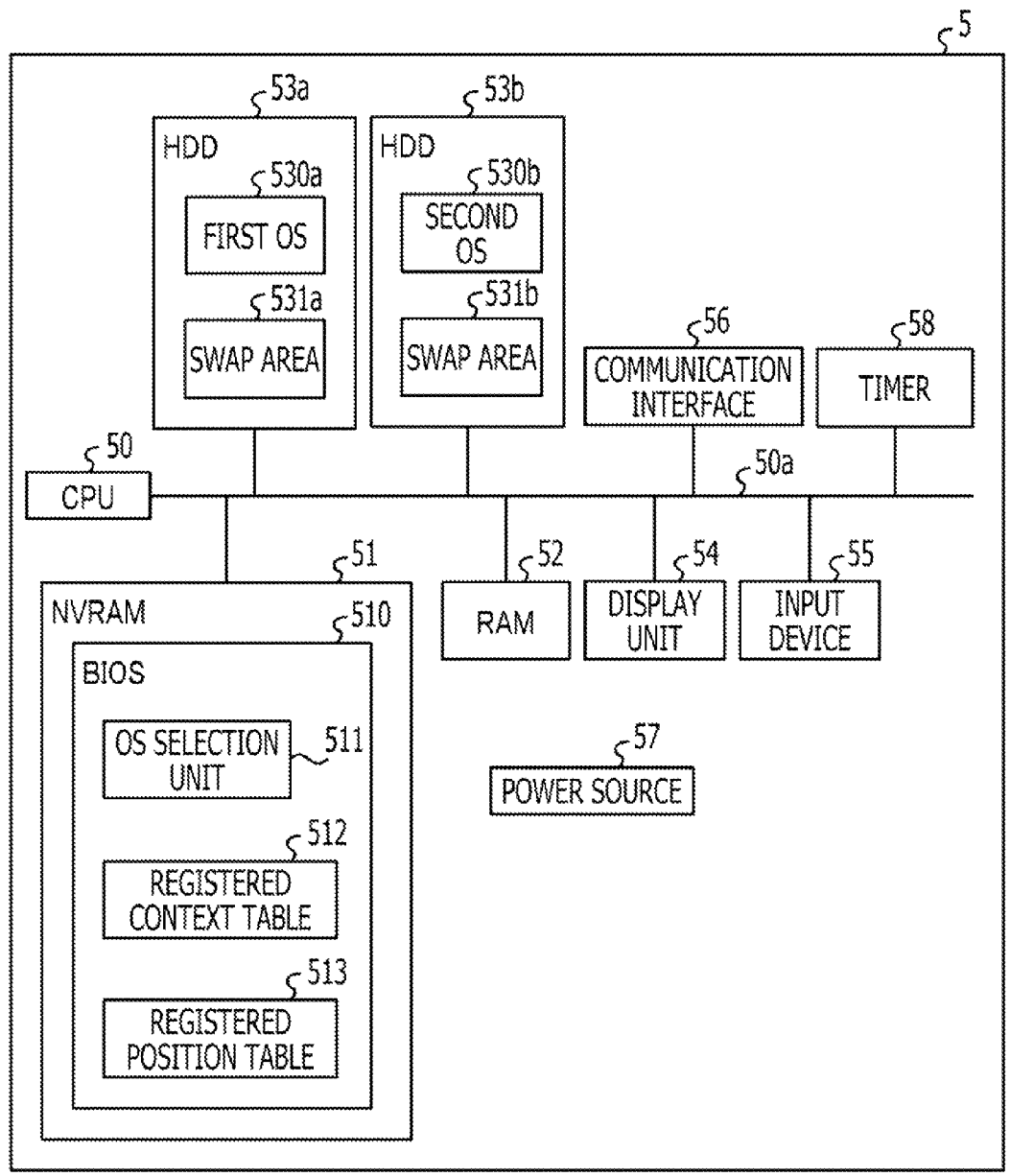
FIG. 8 is a block diagram illustrating an example of internal hardware of a personal computer according to a fourth embodiment.

According to the fourth embodiment, a time is further obtained whereas according to the first embodiment, the CSID information and RSSI information are obtained. FIG. 8 is a block diagram illustrating an example of internal hardware of a personal computer according to the fourth embodiment. A PC 5 includes a timer 58 that outputs a time. Other internal hardware components of the PC 5 are substantially the same as those of the first embodiment, a difference being the reference numerals that are used to describe the hardware components, and thereby will not be described in detail. The PC 5 includes a CPU 50, an NVRAM 51, a RAM 52, a HDD 53a, a HDD 53b, a display device 54, an input device 55, a communication interface 56, and a power source 57. The CPU 50 controls each internal hardware component through a bus 50a. The HDD 53a stores a first OS 530a and includes a swap area 531a. The HDD 53b stores a second OS 530b and includes a swap area 531b.

The NVRAM 51 stores a BIOS 510. The BIOS 510 includes an OS selection unit 511, a registered context table 512, and a registered position table 513. The PC 5 stores a specific position by registering the specific position in the registered position table 513 using CSID information and RSSI information. If CSID information received and obtained by the communication interface 56 and position information received from a base station when resuming operations from the suspend state are stored in the registered position table 513, the PC 5 obtains the corresponding registered position and time that is output by the timer 58. The PC 5 obtains the registered position and time as context information.

FIG. 9 is an example of a record layout of the registered context table 512 according to the fourth embodiment. In the example of FIG. 9, the following four types of context information are registered as registered context. The four types of context information are "use at company 9:00 to 18:00," "use at company other than 9:00 to 18:00", "use at home," and "use at unregistered place." Moreover, an OS to be started up is registered in each registered context as a start-up OS. The "first OS" is registered in the registered context "use at company from 9:00 to 18:00" as the start-up OS. This indicates that the first OS 530a is started up when context information that includes the company at the registered position and the time in a time period of 9:00 to 18:00 are obtained when resuming operations from the suspend state.

The "second OS" is registered in the registered context, "use at company other than 9:00 to 18:00" as a start-up OS. This indicates that the second OS 530b is started up if context information that includes company at the registered position and the time other than 9:00 to 18:00 are obtained when resuming operations from the suspend state. The "second OS" is registered in the registered context, "use at home" as a start-up OS. This indicates that the second OS 530b is started up when context information that includes the home at the registered position is obtained. The "None" is registered in the registered context, "use at unregistered place" as a start-up OS.

The start-up OS, "None" indicates starting an OS is prohibited if context information that does not include a registered position is obtained when resuming operations from a suspend state. In OS start-up processing executed by the CPU 50 through the OS selection unit 511, the time that is output by the timer 58 in addition to the position information at S11 of the flow chart in FIG. 4 may be obtained. Other procedures of the OS start-up processing are substantially the same as those shown in the flow chart illustrated in FIG. 4, and thereby will not be described in detail.

The timer 58 may output a date and a day of the week. In this case, the registered context table 512 may store an OS that is started up, or the prohibition of starting an OS according to a date or a day of the week as registered contexts in addition to the registered position and a time period. Moreover, typically a date or a day of the week may be obtained from the timer 58. In this case, an OS that is started up, or the prohibition of starting an OS according to a registered position and a date or a day of the week may be stored in the registered context table 512 as registered contexts.

According to the fourth embodiment, an OS to be started up is selected or starting up of an OS is prohibited according to a registered time period even when a PC 5 that is placed in a registered position resumes operations from a suspend state. Accordingly, the unauthorized acquisition of data may be reduced, if not substantially prevented, for example, by an unauthorized user who is located at a registered position other than a registered time period and makes the PC 5 resume operations from a suspend state.

The fourth embodiment is as described above. Elements in the fourth embodiment corresponding to those in the first embodiment are assigned with substantially the same reference numerals and processing names, and will not be described in detail about a similar part to the first embodiment.

Fifth Embodiment

Figure 10:
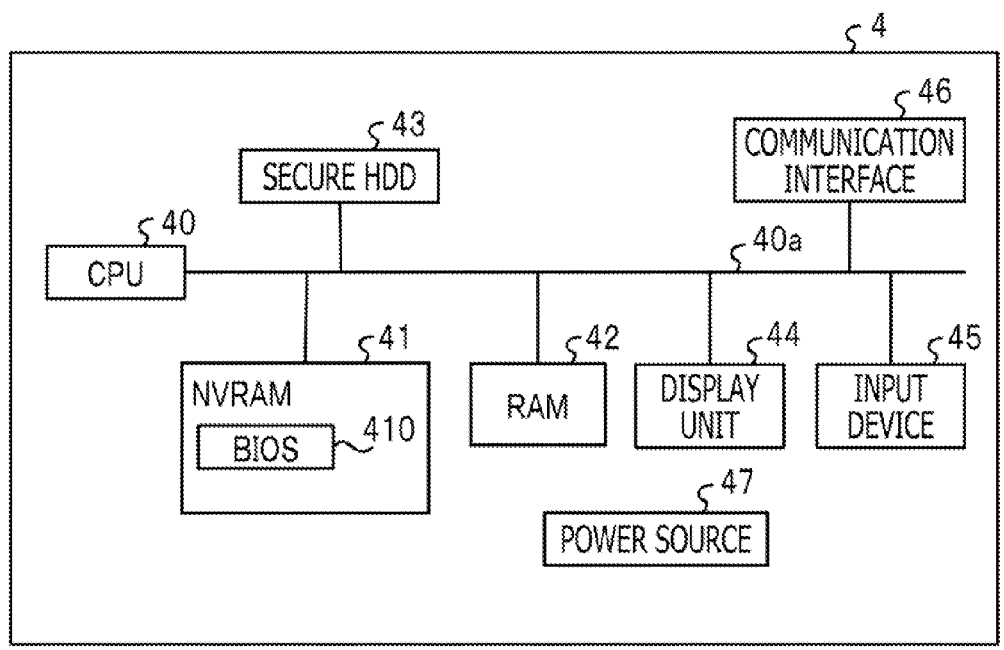
FIG. 10 is a block diagram illustrating an example of internal hardware of a personal computer according to a fifth embodiment.

According to the fifth embodiment, a secure HDD with an authentication function is provided that stores OSs and includes swap areas whereas according to the first embodiment, an HDD without an authentication function is provided. FIG. 10 is a block diagram illustrating an example of internal hardware of a personal computer according to the fifth embodiment. A PC 4 provides an authentication function and includes a secure HDD 43 that authenticates an access to stored contents and an NVRAM 41 that stores a BIOS 410. Other internal hardware components of the PC 4 are substantially the same as those of the first embodiment. Hence, different reference numerals are used to reference the hardware components and will not be described in detail.

The PC 4 includes a CPU 40, a RAM 42, a display device 44, an input device 45, a communication interface 46, and a power source 47. The CPU 40 controls each internal hardware component through a bus 40a. A BIOS 410 is executed by the CPU 40 to initialize each internal hardware when a power switch, which is not illustrated, is turned on and a power source 47 supplies power to each internal hardware component, or when the PC 4 resumes operations from a suspend state. Whether a secure HDD 43 performs authentication is set by the CPU 40. The secure HDD 43 performs authentication of a user when the CPU 40 initializes each internal hardware component according to the BIOS 410 under a condition that performing an authentication is set.

When the secure HDD 43 authenticates the user as an authorized user, the HDD 43 allows an access to stored data from the CPU 40. The secure HDD 43 displays an authentication screen on the display device 44 when the secure HDD 43 performs an authentication of a user and accepts an input operation of a user name and a password from the user through the input device 45. The secure HDD 43 authenticates the user as an authorized user if the secure HDD 43 stores the combination of the accepted user name and the password.

Figure 11:
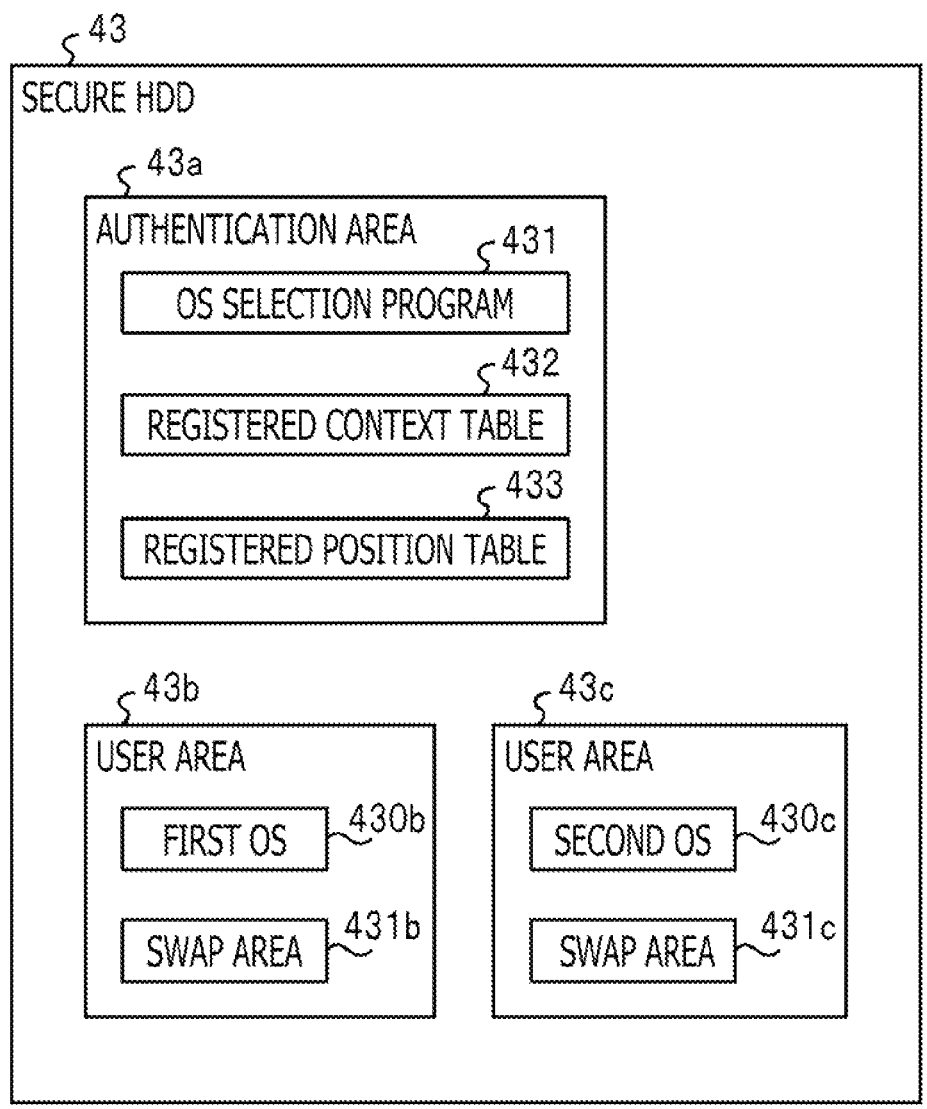
FIG. 11 is a schematic diagram illustrating an example of contents stored in a secure HDD.

FIG. 11 is a schematic diagram illustrating an example of contents stored in the secure HDD 43. A head area of the secure HDD 43 includes a Master Boot Record (MBR) area, which is not illustrated, that stores a program to start a first OS 430b and a second OS 430c and an authentication area 43a. Access to the MBR area and the authentication area 43a are almost always allowed. The secure HDD 43 includes a user area 43b and a user area 43c where a user who is authenticated as an authorized user is allowed to access. The secure HDD 43 allows an access to the user area 43b and the user area 43c without performing authentication when the secure HDD 43 is set by the CPU 40 so as not to perform authentication.

The authentication area 43a stores an OS selection program 431 to select and start up an OS when resuming operations from a suspend state, a registered context table 432, and a registered position table 433. For example, a Trusted Computing Group (TCG)-compliant HDD that complies with specifications prepared by the TCG may be used in order to achieve a computer security function as the secure HDD 43. The authentication area 43a is a Pre-Boot Authentication (PBA) area, for example, included in a head area of a TCG compliant HDD. Moreover, a user authentication executed by the secure HDD 43 is, for example, a Pre boot authentication executed by a TCG compliant HDD.

The user area 43b stores the first OS 430b and includes a swap area 431b. The user area 43c stores the second OS 430c and includes a swap area 431c. When the secure HDD 43 allows access to the user area 43b and the user area 43c, for example, an MBR Shadowing function provided, for example, by a TCG compliant HDD may be used. A head area of a TCG compliant HDD is duplexed by having an image before an authentication in a Shadow MBR area and a PBA area and an image after the authentication in an MBR area and a user area.

The head area of the TCG compliant HDD has an image before an authentication under a condition that the power source 47 supplies power, and the CPU 40 may access typically the MBR area and the PBA area. When a user is authenticated as an authorized user by a Pre boot authentication, the head area of the TCG compliant HDD is switched from an image before the authentication to an image after the authentication. Here, an "image" means information to which the computer can be understood (such as OSs or user data). As a result, the CPU 40 may access to the MBR area and the user area. When the TCG compliant HDD is used as a secure HDD 43, the user area 43b and the user area 43c may be provided by using a Range setting function. The Range setting function of the TCG compliant HDD divides a storage area into a plurality of areas that are accessed by an individual encryption key.

The Range setting function of the TCG compliant HDD provides not only a function to encrypt an entire storage area but also provides a partial encryption function that sets an encryption key to each specified area. For example, when a user is authenticated as an authorized user by a Pre boot authentication, the Range setting function may be used to set the user area 43b and the user area 43c where typically the user may access using an individual encryption key. Accordingly, the loss of data from a user area where an access is not allowed may be reduced, if not substantially prevented.

FIG. 12 is an example of a record layout of the registered context table 432 according to the fifth embodiment. In the example of FIG. 12, three types of context information, "use at company," "use at home," and "use at an unregistered place" are stored as registered context information. Authentication settings indicating whether an authentication is performed, and a start-up OS that is an OS to be started up or the prohibition of starting an OS are registered in each registered context. The "No authentication" and the start-up OS "first OS" are registered in the context information, "use at company." This indicates that the first OS 430b is started without any user authentication by the secure HDD 43 if context information that includes company at the registered position is obtained when resuming operations from a suspend state.

The authentication settings, "authenticate" and a start-up OS, "second OS" are registered in the registered context, "use at home." This indicates that the secure HDD 43 authenticates a user if context information that includes a home at the registered position is obtained when resuming operations from a suspend state and the user is authenticated as an authorized user, the second OS 430c is started. The authentication settings "authenticate" and a start-up OS "None" are registered in the registered context, "use at unregistered place." This indicates that the secure HDD 43 performs an authentication of a user but the starting up of an OS is prohibited when context information that does not include a registered position is obtained when resuming operations from a suspend state. In this case, access to the user area 43b and the user area 43a are allowed if the user is authenticated as an authorized user; however, no OS is started up.

Figure 13A:
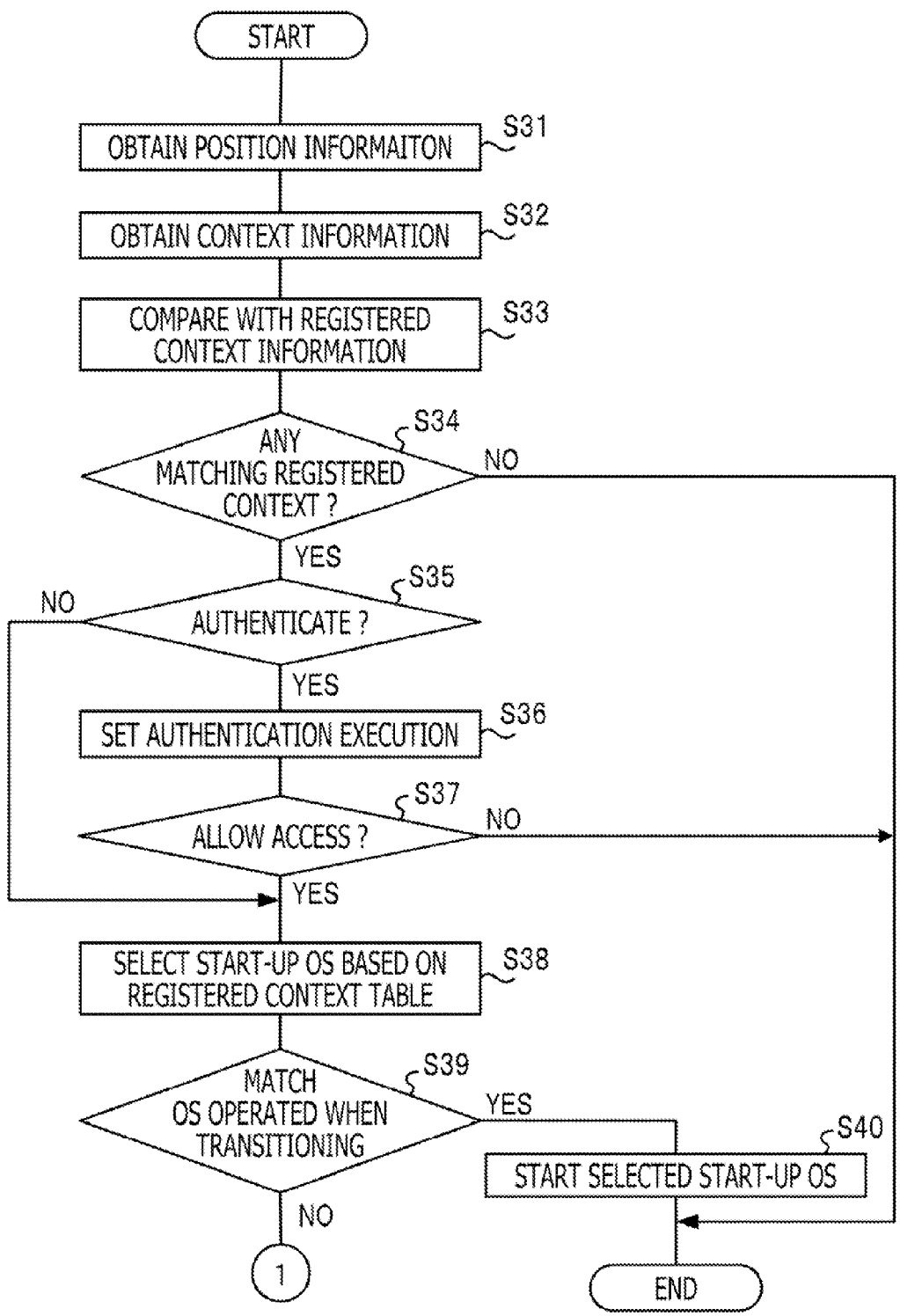
FIGS. 13A and 13B are flow charts illustrating procedures of Operating system (OS) start-up processing according to the fifth embodiment.
Figure 13B:
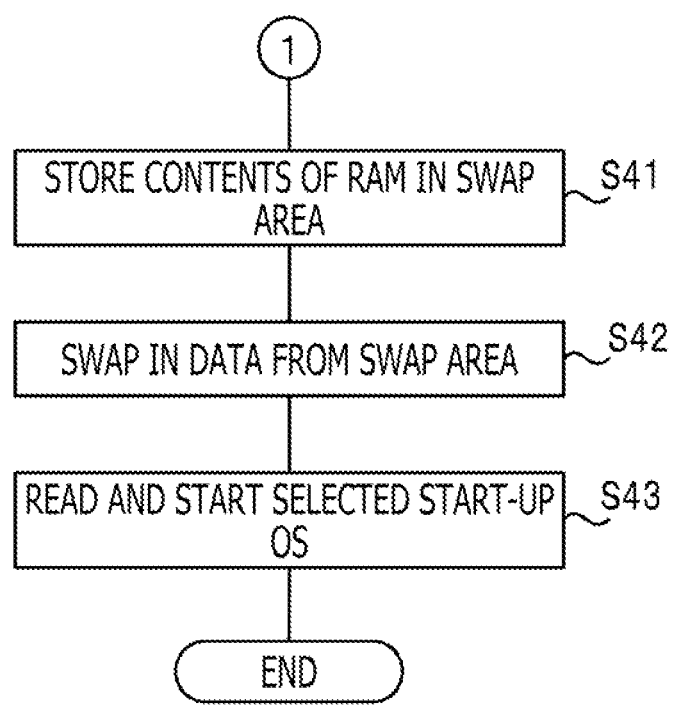

FIGS. 13A and 13B are flow charts illustrating procedures of OS start-up processing according to the fifth embodiment. The OS start-up processing is executed by the CPU 40 according to the OS selection program 431 read from the authentication area 43a of the secure HDD 43 when the PC 4 resumes operations from a suspend state. The CPU 40 obtains position information including CSID information and RSSI information received and obtained through the communication interface 46 (S31). The CPU 40 obtains context information based on the obtained position information and the registered position table 433 (S32). The CPU 40 compares the obtained context information with the registered contexts stored in the registered context table 432 (S33).

The CPU 40 determines whether there is any registered context that matches the obtained context information as a result of the comparison (S34). When the CPU 40 determines that there is a registered context that matches the obtained context information (Yes at S34), the CPU 40 determines whether the authentication settings "authenticate" is stored in the registered context table 432 in association with the matched registered context (S35). When the CPU 40 determines that the authentication settings is to authenticate (Yes at S35), the CPU 40 sets so as to make the secure HDD 43 execute an authentication (S36). The secure HDD 43 that is set so as to execute an authentication accepts a combination of a log in name and a password. When the accepted combination of the log in name and the password is stored in the secure HDD 43, the secure HDD 43 authenticates the user as an authorized user and allows the user to access the user area 43b and the user are 43c.

The CPU 40 determines whether the secure HDD 43 allows the user to access the user area 43b and the user area 43c (S37). When the CPU 40 determines the access is allowed (Yes at S37), the CPU 40 selects a start-up OS stored in the registered context table 432 in association with the matched registered context (S38). The CPU 40 determines whether the selected start-up OS matches the OS that is running when transitioning to the suspend state (S39). If the CPU 40 determines the selected start-up OS matches the OS that is running when transitioning to the suspend state (Yes at S39), the CPU 40 starts the OS stored in the RAM 42 (S40) and ends the OS start-up processing.

If the CPU 40 determines the selected start-up OS does not match the OS that is running when transitioning to the suspend state (No at S39), the CPU 40 swaps out data stored in the RAM 42 to the swap area 431b or the swap area 431c (S41). When the first OS 430b is stored in the RAM 42, data stored in the RAM 42 is stored in the swap area 431b. When the second OS 430c is stored in the RAM 42, data stored in the RAM 42 is stored in the swap area 431c. The CPU 40 swaps in data that is swapped out to the swap area 431b or the swap area 431c to the RAM 42 (S42).

The CPU 40 reads data from the swap area 431b when the start-up OS is the first OS 430b. The CPU 40 reads data from the swap area 431c when the start-up OS is the second OS 430c. The CPU 40 reads and starts the first OS 430b or the second OS 430c that is selected as a start-up OS from the user area 43b or the user area 43c (S43), and ends the OS start-up processing. When the CPU 40 determines that there is no matching registered context (No at S34), the CPU 40 ends the OS start-up processing without starting up any OS.

Accordingly, when there is no registered context that matches the context information obtained when resuming from the suspend state; starting up an OS is prohibited. Moreover, when the CPU 40 determines that the authentication settings is not to authenticate (No at S35), the CPU 40 proceeds to S38 without setting execution of an authentication to the secure HDD 43. When the CPU 40 determines that no access is allowed at S37 (No at S37), the CPU 40 ends the OS start-up processing without starting any OS. Accordingly, starting up an OS is prohibited when the secure HDD 43 does not authenticate a user as an authorized user.

According to the fifth embodiment, a case is described in which the swap area 431b and the swap area 431c are stored in the user area 43b and the user area 43c respectively. However, the embodiment is not limited to this case. For example, the swap area 431b and the swap area 431c may be stored in one of the authentication area 43a, the user area 43b, or the user area 43c. Furthermore, a case is described in which the swap area 431b and the swap area 431c are included in the secure HDD 43. However, the embodiment is not limited to this case but; for example, the swap area 431b and the swap area 431c may be included in the NVRAM 41.

According to the fifth embodiment, a plurality of OSs is stored in the secure HDD 43 and swap areas are included in the secure HDD 43 to which a user who is authenticated as an authorized user is allowed to access and thereby reducing if not preventing an unauthorized user from making the PC 4 resume operations from a suspend state and reading data. Furthermore, whether a user authentication is executed is set based on context information to the secure HDD 43 and this allows to skip a user authentication at a location where a possibility that loss of data to an unauthorized user is low, thereby reducing a time consuming operation to resume from the suspend state.

The fifth embodiment is as described above. Elements in the fifth embodiment corresponding to those in the former embodiments (the first embodiment to the forth embodiment) are assigned with substantially the same reference numerals and processing names, and will not be described in detail about a similar part to the former embodiments.

Sixth Embodiment

According to the sixth embodiment, context information is obtained after a secure HDD performs a user authentication whereas according to the fifth embodiment, a user authentication is performed by a secure HDD to which execution of authentication is set after context information is obtained. Respective internal hardware components are substantially the same as those of the fifth embodiment and substantially the same reference numerals are assigned to describe the components. A PC 4 obtains a registered position obtained when resuming operations from a suspend state and a user name authenticated by a secure HDD 43 as context information. The user name is accepted when the secure HDD 43 authenticates the user together with a password.

FIG. 14 is an example of a record layout of a registered context table 432 according to the sixth embodiment. In the example of FIG. 14, the following four types of context information are registered as registered contexts. The four types of context information are "use company's PC environment at company," "use home's PC environment at home," "use company's PC environment at home," and "use at unregistered place." An OS to be started up or the prohibition of starting an OS is registered in each registered context. Moreover, a start-up OS, "first OS" is registered in the "use company's PC environment at company."

The "first OS" registered in the "use company's PC environment at company" indicates that the first OS 430b is started up if context information that includes a company at the registered position, and a user name, "company" are obtained when resuming operations from the suspend state. The "company's PC environment" included in the registered context indicates an environment provided by an OS that is started up in association with the user name "company." A start-up OS "second OS" is registered in the "use home's PC environment at home." This indicates the second OS 430b is started up when context information that includes a home at the registered position, and a user name, "home" are obtained when resuming operations from the suspend state.

The "home's PC environment" included in the registered context indicates an environment provided by an OS that is started up in association with the user name "home." The "first OS" is registered in the registered context, "use company's PC environment at home" as a start-up OS. This indicates that the first OS 430b is started up when context information that includes a home at the registered position and a user name, "company" are obtained when resuming from the suspend state. The "None" is registered in the registered context, "use at unregistered place" as a start-up OS. The start-up OS, "None" indicates starting an OS is prohibited when context information that does not include a registered position is obtained when resuming operations from a suspend state.

Figure 15A:
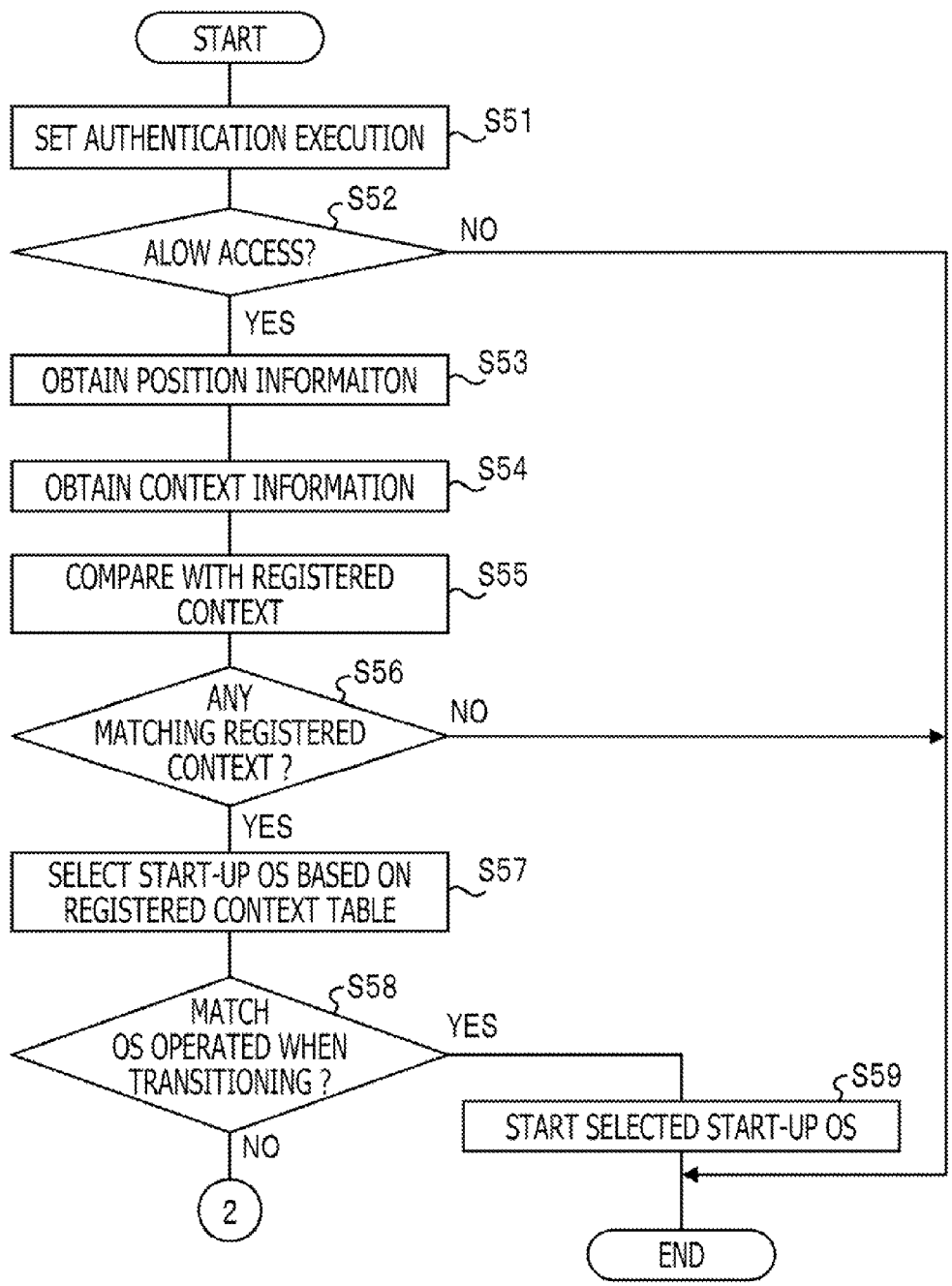

FIGS. 15A and 15B are flow charts illustrating procedures of OS start-up processing according to the sixth embodiment. The OS start-up processing is executed by the CPU 40 according to an OS selection program 431 read from the authentication area 43a of the secure HDD 43 when the PC 4 resumes operations from a suspend state. The CPU 40 is set so that the secure HDD 43 performs authentication (S51). As a result, the secure HDD 43 accepts a user name and a password and performs authentication of the user, if the user is authenticated as an authorized user, allows the user to access the user area 43b and the user are 43c.

The CPU 40 determines whether the secure HDD 43 allows the user to access the user area 43b and the user area 43c (S52). When the CPU 40 determines the access is allowed (Yes at S52), the CPU 40 obtains position information including CSID information and RSSI information received and obtained through the communication interface 46 (S53). The CPU 40 obtains context information based on the obtained position information, the registered position table 433, and the user name accepted by the user authentication of the secure HDD 43 (S54). The CPU 40 compares the obtained context information with the registered contexts stored in the registered context table 432 (S55).

The CPU 40 determines whether there is any registered context that matches the obtained context information as a result of the comparison (S56). When the CPU 40 determines that there is a registered context that matches the obtained context information (Yes at S56), the CPU 40 selects a start-up OS stored in the registered context table 432 in association with the matched registered context (S57). The CPU 40 determines whether the selected OS matches an OS that is running before transitioning to the suspend state (S58). When the CPU 40 determines the selected OS matches the OS that is running before transitioning to the suspend state (Yes at S58), the CPU 40 starts the OS stored in the RAM 42 (S59) and ends the OS start-up processing.

When the CPU 40 determines the selected OS does not match an OS that is running before transitioning to the suspend state (No at S58), the CPU 40 swaps out data stored in the RAM 42 to the swap area 431b or the swap area 431c (S60). When the first OS 430b is stored in the RAM 42, data stored in the RAM 42 is stored in the swap area 431b. When the second OS 430c is stored in the RAM 42, data stored in the RAM 42 is stored in the swap area 431c. The CPU 40 swaps in data that is swapped out to the swap area 431b or the swap area 431c to the RAM 42 (S61).

The CPU 40 reads data from the swap area 431b when the start-up OS is the first OS 430b. The CPU 40 reads data from the swap area 431c when the start-up OS is the second OS 430c. The CPU 40 reads and starts the first OS 430b or the second OS 430c that is selected as a start-up OS from the user area 43b or the user area 43c (S62), and ends the OS start-up processing.

When the CPU 40 determines the access is not allowed at S52 (No at S52), the CPU 40 ends the OS start-up processing without starting any OS. Moreover, when the CPU determines that there is no matching registered context (No at S56); the CPU 40 ends the OS start-up processing without starting any OS.

According to the sixth embodiment, an OS to be started up may be selected not only according to a position where the PC 4 is located but also according to a user name. Furthermore, the sixth embodiment reduces if not substantially prevents an unauthorized user from making the PC 4 resume operations from a suspend state at a registered place and reading data.

The sixth embodiment is as described above. Elements in the sixth embodiment corresponding to those in the former embodiments (the first embodiment to the fifth embodiment) are assigned with substantially the same reference numerals and processing names, and will not be described in detail about a similar part to the former embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a processer;
a non-volatile memory configured to store a plurality of programs;
a volatile memory configured to store at least one program among the plurality of programs executed by the processor and data accessed by the at least one program;
an acceptance unit configured to accept context information when power supplied to the processor is resumed from a state in which power supplied to the processor is interrupted while a power supplied to the volatile memory is maintained;
a selection unit configured to select one program from the plurality of programs stored in the non-volatile memory based on context information accepted by the acceptance unit; and
a program determination unit configured to determine whether the one program selected by the selection unit is stored in the volatile memory,
the processor being configured to swap out data stored in the volatile memory to the non-volatile memory in association with a program stored in the non-volatile memory, and swap in the one program selected by the selection unit from the non-volatile memory to the volatile memory and start up the program when the program determination unit determines the selected one program is not stored in the volatile memory; and
the processor being configured to start the one program stored in the volatile memory when the processor determines the one program selected by the program determination unit is stored in the volatile memory.

2. The information processing apparatus according to claim 1,
wherein the processor swaps in data that is associated with the one program selected by the selection unit from the non-volatile memory to the volatile memory when the program determination unit determines the selected one program is not stored in the volatile memory.

3. The information processing apparatus according to claim 1, further comprising:
a prohibition determination unit configured to determine whether starting up of the one program is prohibited based on context information by the acceptance unit,
wherein the processor does not start up the one program when the prohibition determination unit determines to prohibit starting up the program.

4. The information processing apparatus according to claim 1, further comprising:
a position detector configured to detect a position of the information processing apparatus;
wherein the context information includes information indicating a position detected by the position detector.

5. The information processing apparatus according to claim 1, further comprising:
a receiver configured to receive a radio wave together with identification information of a transmission source;
wherein the context information includes identification information received by the receiver.

6. The information processing apparatus according to claim 5,
wherein the receiver is configured to detect a signal intensity of a radio wave and the context information includes information indicating the signal intensity detected by the receiver.

7. The information processing apparatus according to claim 1, further comprising:
an acceleration detector configured to detect an acceleration applied to the information processing apparatus; and
a history storage unit configured to store a history of acceleration detected by the acceleration detector,
wherein the context information includes the history of acceleration stored in the history storage unit.

8. The information processing apparatus according to claim 1, further comprising:
a geomagnetic intensity detector configured to detect a geomagnetic intensity,
wherein the context information includes information indicating the geomagnetic intensity detected by the geomagnetic intensity detector.

9. The information processing apparatus according to claim 1, further comprising:
a timer configured to output time,
wherein the context information includes information indicating a time that is output by the timer.

10. The information processing apparatus according to claim 1, further comprising:
an authentication unit configured to authenticate a user to allow the processor to swap in the one program from the non-volatile memory to the volatile memory when the authentication unit authenticates the user as an authorized user.

11. A method to start up a program by an information processing apparatus that includes a processor, a non-volatile memory storing a plurality of programs and a volatile memory storing at least one program among the plurality of programs executed by the processor and data accessed by the one program, the method comprising:
accepting context information when power supplied to the processor is resumed from a state in which power supplied to the processor is interrupted while a power supplied to the volatile memory is maintained;
selecting one program from the plurality of programs stored in the non-volatile memory based on the accepted context information;
determining whether the selected one program is stored in the volatile memory;
swapping out data stored in the volatile memory to the non-volatile memory in association with a program stored in the volatile memory, and swapping in the selected one program from the non-volatile storage memory to the volatile memory and starting up the program when the selected one program is not stored in the volatile memory; and
starting up the one program stored in the volatile memory when the selected one program is determined to be stored in the volatile memory.

12. A computer-readable non-transitory recording medium including a computer program recorded thereon that causes an information processing apparatus to start up a program, the information processing apparatus including a processor, a non-volatile memory storing a plurality of programs and a volatile memory storing at least one program executed by the processor and data accessed by the one program, the computer program causing the information processing apparatus to perform operations comprising:
accepting context information when power supplied to the processor is resumed from a state in which power supplied to the processor is interrupted while a power supplied to the volatile memory is maintained;
selecting one program from the plurality of programs stored in the non-volatile memory based on the accepted context information; and
determining whether the selected one program is stored in the volatile memory;
swapping out data stored in the volatile memory to the non-volatile memory in association with a program stored in the volatile memory, and swapping in the selected one program from the non-volatile storage memory to the volatile memory and starting up the program when the selected one program is not stored in the volatile memory; and
starting up the one program stored in the volatile memory when the selected one program is determined to be stored in the volatile memory.

13. The computer-readable non-transitory recording medium according to claim 12, wherein the computer program is a Basic Input Output System.

14. An information processing apparatus comprising:
a non-volatile memory configured to store a plurality of programs;
a volatile memory configured to store at least one program and data accessed by the program; and
a processer coupled to the non-volatile memory and the volatile memory and configured to
accept context information when power supplied to the processor is resumed from a state in which power supplied to the processor is interrupted while a power supplied to the volatile memory is maintained,
select a program from the plurality of programs stored in the non-volatile memory based on context information,
determine whether the selected program is stored in the volatile memory,
when the selected program is not stored in the volatile memory, swap out data stored in the volatile memory to the non-volatile memory in association with a program stored in the non-volatile memory, and swap in the selected program from the non-volatile memory to the volatile memory and start up the selected program, and when the selected program is stored in the volatile memory, start up the selected program stored in the volatile memory.

15. The information processing apparatus according to claim 14, wherein the processor is configured to determine whether starting up of the selected program is prohibited based on the context information.

* * * * *